United States Patent [19]

Tuason, Jr. et al.

[11] Patent Number: 5,366,742
[45] Date of Patent: Nov. 22, 1994

[54] COLLOIDAL MICROCRYSTALLINE CELLULOSE AND BARRIER DISPERSANT COMPOSITION AND METHOD FOR MANUFACTURE

[75] Inventors: Domingo C. Tuason, Jr., Bensalem; Emanuel J. McGinley, Morrisville, both of Pa.

[73] Assignee: FMC Corporation, Philadelphia, Pa.

[21] Appl. No.: 57,058

[22] Filed: May 3, 1993

[51] Int. Cl.$^5$ .................. A23L 1/0532; A23L 1/0534
[52] U.S. Cl. ...................... 426/96; 426/573; 426/575; 426/658; 426/804; 252/315.3
[58] Field of Search ............ 426/96, 575, 658, 804, 426/573; 252/316

[56] References Cited

U.S. PATENT DOCUMENTS

| | | | |
|---|---|---|---|
| 2,403,547 | 7/1946 | Peschardt | 426/575 |
| 3,012,892 | 12/1961 | Marcus et al. | 426/575 |
| 3,060,032 | 10/1962 | Glicksman | 426/575 |
| 3,093,483 | 6/1963 | Ishler et al. | 426/549 |
| 3,539,365 | 11/1970 | Durand et al. | 426/658 |
| 3,573,058 | 3/1971 | Tiemstra | 426/573 |
| 4,192,900 | 3/1980 | Cheng | 426/579 |
| 4,216,242 | 8/1980 | Braverman | 426/573 |
| 4,263,334 | 4/1981 | McGinley | 426/573 |
| 4,264,637 | 4/1981 | Braverman | 426/573 |
| 4,311,717 | 1/1982 | McGinley | 426/330.2 |
| 4,624,856 | 11/1986 | Vanderveer et al. | 426/549 |
| 4,980,193 | 12/1990 | Tuason et al. | 426/654 |
| 5,082,684 | 1/1992 | Fung et al. | 426/602 |
| 5,192,569 | 3/1993 | McGinley | 426/96 |

OTHER PUBLICATIONS

Food Theory & Applications, Paul & Palmer, Chapter 4, p. 199 "Starch and Other Pilysaccharides" by E. Osman, Wiley & Sons, NY 1972.

The Merck Index, 9th Ed. Merck & Co., Rahway, N.J. (pub.) 1976 at No. 230.

Gum Technology in the Food Industry by Glicksman, Academic Press, NY (1969).

Handbook of Water-soluble Gums and Resins, Chapter 2–Alginates by Cottrell & Kovacs, McGraw-Hill Book Co., N.Y. (1980).

Calcium Salts in Algin Gel Systems: Technical Supplement No. 2, Kelco Co.

Microcrystalline Polymer Science, Chapter 2–"Micrystalline Cellulose" O. A. Battista, McGraw-Hill, NY (1975) pp. 15–57.

Primary Examiner—Jeanette M. Hunter
Attorney, Agent, or Firm—Mark A. Greenfield; Anthony L. Cupoli; Robert L. Andersen

[57] ABSTRACT

A dry composition comprising attrited MCC particles at least partially coated with a barrier dispersant which is an alginate calcium/sodium salt complex; processes for manufacturing the barrier dispersant and MCC particle composition; and methods for using the inventive composition. The alginate salt complex barrier dispersant permits attrited MCC particles to be dried without agglomeration and then to be dispersed in an aqueous medium.

27 Claims, No Drawings

COLLOIDAL MICROCRYSTALLINE CELLULOSE AND BARRIER DISPERSANT COMPOSITION AND METHOD FOR MANUFACTURE

BACKGROUND OF THE INVENTION

1. Field of the Invention

This invention relates to a composition comprising beta-1,4 glucan particles, more specifically food grade attrited non-derivatized microcrystalline cellulose (MCC) particles, at least partially coated or occluded by a food grade barrier dispersant comprising a calcium/sodium alginate salt complex. The barrier dispersant permits dry attrited MCC particles to be formed without agglomeration and subsequently redispersed to a colloidal type suspension in aqueous media. The invention also relates to processes for the manufacture of the composition, and methods for its use.

2. Statement of Related Art

Microcrystalline cellulose (MCC) comprises the tiny rodlike microcrystals of partially hydrolyzed cellulose (beta-1,4 glucan). Colloidal MCC is employed as a bodying agent and a retardant of crystal growth in frozen desserts. In oil-in-water emulsions, the MCC solid particles coat the oil droplets and also thicken the aqueous phase. Another use for colloidal MCC is as a foam stabilizer in aerated food systems. [see Food Theory and Applications, Paul & Palmer, Chapter 4, p. 199 "Starch and Other Polysaccharides" by E. Osman, Wiley & Sons, N.Y. (pub) 1972].

The beta-1,4 glucan may be derived from any desired chemical degradation method applied to a selected cellulose material. Upon completion of the desired degradation, the residue is collected as a filter cake and is thoroughly washed to remove insoluble impurities. The washed cake, preferably containing about 40% solids, is then subjected to mechanical disintegration. In the chemical degradation treatment and subsequent washing, microcrystalline cellulose is freed by cleaving the cellulose chains in the amorphous regions. The individual crystallites then must be separated or peeled from the treated fiber or fragment. During the disintegration newly created surfaces are formed as the microcrystals are separated from the degraded material, and unless the individual microcrystals are maintained in a separated condition they will re-bond. In order to obtain efficient shearing, the solids content of the mass being subjected to disintegration should be sufficiently high to provide an efficient transfer of the shear forces. On the other hand, the solids content should not be so high as to allow the separated micro-crystals to coalesce and form large aggregates owing to insufficient water present to hydrate with the newly created surfaces of the microcrystals.

The mechanical attrition may be effected by the use of various standard equipment such as kitchen mixers, planetary mixers, ball mills, attrition mills, high-speed shearing devices such as a Waring blender, and the like. Additionally, the residue of the hydrolysis treatment preferably in the presence of an aqueous medium, may be subjected to a shearing action and to a rubbing action between the particles by forcing the mixture of residue and aqueous medium through passages of limited cross-section such as found in perforated plates. The attrition should be sufficient to produce a mass wherein at least about 1% by weight and preferably at least 30% by weight of the particles have an average length not greater than 1.0 micron as determined by electron microscopic examination. Some of the particles in such a mass may have a length or maximum dimension as low as a few hundredths of a micron.

It is desirable to dry the attrited material in order to achieve efficiencies of storage and shipping. However the dried product becomes hornified, probably due to agglomeration of numbers of smaller particles that become bonded together by hydrogen bonding forces during drying. These forces are second in strength only to primary valence bonds and accordingly, when the dried product is to be redistributed in an aqueous medium, substantial amounts of energy are required to break the hydrogen bonds.

In order to break this hydrogen bonding, U.S. Pat. No. 3,539,365 - Durand, et al. suggests coating the beta-1,4glucan particles with a barrier material and the patent mentions a variety of materials useful for this purpose and indicates sodium carboxymethylcellulose (CMC) as being the most effective. This patent states (at column 5) that methylcellulose, hydroxypropyl methylcellulose, guar gum, alginates, sugars, surfactants and other hydrocolloids may have a slight barrier action when added in appreciably higher proportions. Sodium carboxymethylcellulose is not universally acceptable in food products.

U.S. Pat. No. 4,263,334 - McGinley, recognizing the same problem, avoids the use of CMC by teaching a combination of additives consisting of a first ingredient which is a carbohydrate sweetener such as sucrose, dextrose, or hydrolyzed cereal solids and a second ingredient which is a hydrocolloid gum such as guar gum, locust bean gum, gum arabic, sodium alginate, propylene glycol alginate, carrageenan, gum karaya, or xanthan gum.

U.S. Pat. No. 3,573,058 - Tiemstra discloses compositions of attrited MCC admixed with various hydrocolloids and then co-dried by various methods including spray drying. Sodium alginate and propylene glycol alginate are disclosed as useful hydrocolloids, among many others. It is asserted that the compositions permit dry storage and rehydration without the need for additional attrition after drying.

U.S. Pat. No. 4,311,717 - McGinley discloses a stabilizing agent for dry mix food products which consists of MCC, sodium carboxymethylcellulose, and whey or milk solids. In this instance, the sodium carboxymethylcellulose combined with the whey or milk solids acts as a barrier between the dry cellulose particles, functioning as a barrier dispersant.

U.S. Pat. No. 4,980,193 - Tuason, et al. discloses a cellulose based stabilizer system consisting of attrited cellulose, starch, a non-thickening water-soluble diluent such as maltodextrin, and whey or non-fat dry milk.

Alginates: Alginic acid is identified in *The Merck Index*, 9th ed., Merck & Co., Rahway, N.J. (pub.) 1976 at no. 230 as a hydrophilic, colloidal polysaccharide obtained from seaweed which is very slightly soluble in water. When it is in the form of its sodium salt, however, it becomes readily soluble in water, forming a viscous colloidal solution [see *The Merck Index*, above, at no. 229]. According to Merck, sodium alginate has known uses in the manufacture of ice cream where it serves as a stabilizing colloid; in drilling muds; in coatings; in the flocculation of solids in water treatment; as a sizing agent; thickener; emulsion stabilizer; suspending agent in soft drinks; in dental impression preparations; and in pharmaceutical preparations as a suspending agent. The conversion of water-soluble sodium alginate to water-insoluble calcium alginate by the addition of a calcium salt is known. While the thickening properties of alginate salts generally are well known, it is important to distinguish between the use of alginates as barrier dispersants for a dry product which will be added to water and the use of alginates in existing aqueous systems.

The gelation of algin polymers with polyvalent cations, and in particular with calcium, is well known and is discussed in *Gum Technology in the Food Industry* by Glicksman, Academic Press, N. Y. (1969) at 245-246 and in the *Handbook of Water-Soluble Gums and Resins, Chapter 2 - Alginates* by Cottrell & Kovacs, McGraw-Hill Book Co., N.Y. (1980), at 2-10 through 2-15.

U.S. Pat. No. 3,012,892 - Marcus discloses the precipitation of alginic acid from sodium alginate by the addition of an alginate solution to acidic calcium chloride solution whose pH is 4 or less.

U.S. Pat. No. 5,082,684 - Fung discloses the cross-linking of sodium alginate with calcium salts, including calcium chloride.

U.S. Pat. No. 3,060,032 - Glicksman discloses gelling sodium alginate with tricalcium phosphate, dicalcium phosphate, calcium carbonate, calcium tartrate, or calcium sulfate, with the control of gelling by the use of a retarding agent such as sodium hexametaphosphate, trisodium phosphate, tetrasodium pyrophosphate, sodium tetraphosphate, sodium tripolyphosphate, or a calcium complexing agent such as sodium carbonate or sodium citrate. The calcium salt is employed at a level of 10 to 50, preferably 25 % by weight of the algin.

U.S. Pat. Nos. 4,216,242 and 4,264,637 - Braverman disclose the use of alginates as stabilizers in combination with MCC in aqueous freezable gel compositions which also may contain starch and/or xanthan gum and/or sodium carboxymethylcellulose. Both of these patents state that calcium tends to form non-reversible gels with alginates.

U.S. Pat. No. 4,192,900 - Cheng discloses in its description of the prior art that it is known that sodium alginate becomes a viscous mass when dissolved in water and is capable of solidification by calcium chloride, citing to U.S. Pat. Nos. 2,403,547 and 3,093,483. This patent discloses mixing starch with a gelling hydrocolloid (preferably sodium alginate) and/or methylcellulose and, where the hydrocolloid is sodium alginate, gelling it by contacting it with calcium ions (particularly calcium chloride), followed by drying of the particles.

U.S. Pat. No. 4,624,856 - Vanderveer, et al., discloses addition of a calcium source to a sodium alginate to form a gel which is capable of being ground.

SUMMARY OF THE INVENTION

This invention affords a composition comprising food grade colloidal MCC particles at least partially coated or occluded by a food grade barrier dispersant consisting essentially of a calcium/sodium alginate salt complex. The particle size of "colloidal" MCC particles is known in the art and may be defined as MCC particles which have been attrited to the point where they are small enough to permit the MCC particles to function like a colloid, especially in an aqueous system. The coating portion of the inventive composition serves the dual functions of [1] a barrier—permitting attrited MCC particles to be dried from a wetcake without undue agglomeration and [2] a dispersant—allowing the dry particles to be redispersed when added to an aqueous system. For the above reasons, the barrier dispersant must be present in both a barrier-effective amount and a dispersant-effective amount. MCC comprises 65 to 95 wt % of the MCC/alginate complex composition, preferably 70 to 90 wt %, most preferably 80 to 90 wt %, the balance to 100 wt % being the alginate complex. Within the alginate salt complex, the weight ratio of calcium:sodium is 0.43-2.33:1, preferably 1-2:1, most preferably 1.3-1.7:1, with 1.5:1 being optimum.

The presence of the alginate calcium/sodium salt complex barrier dispersant serves the important dual functions of permitting: [1] coated particles of attrited MCC to be dried from an aqueous wetcake without hornification or other agglomeration, stored and handled as desired; and then [2] the coated particles to be readily redispersed in an aqueous media. The re-dispersed attrited MCC of this invention exhibits the desirable thixotropic and other properties of colloidal MCC. In particular, aqueous dispersions of MCC:alginate compositions according to this invention produced pseudoplastic, thixotropic, shear-thinning gels somewhat similar to those of existing colloidal MCC products alone except that they were stronger but less elastic.

It is a further advantage of the inventive co-processed MCC:alginate complex compositions that they exhibit desirable properties which are not universally found in existing colloidal MCC products such as dispersibility in milk systems and the ability to form milk gels.

Beside the inventive composition's utility in certain major applications where colloidal grades of MCC are used including frozen desserts and salad dressings, it also can be used in instant cocoa mixes, dry blended sauces, gravies, and instant milk puddings.

This invention also comprises processes for manufacturing the inventive composition. The processes may be considered the controlled precipitation onto attrited MCC particles in colloidal-type aqueous suspension of an at least partially water-insoluble alginate salt complex from an aqueous mixture of a water-soluble alginate salt. The practicality of this invention is dictated by a combination of commercial availability and the most important fact that a calcium/sodium salt complex is food grade.

In the processes of this invention, the only useful water-soluble algin salt is sodium alginate.

The calcium salts useful for affording calcium ions to the calcium/sodium alginate salt complex formed in the method of this invention are all those which dissociate at least to some degree in water and which do not leave residues not approved for food use. Even insoluble to slightly soluble (in water) calcium salts can be used where a slow reaction is desired, although more soluble salts are preferred. A slower release of calcium ions also can be achieved by acidification of the aqueous system. Useful calcium salts include, but are not limited to, calcium: acetate, carbonate, chloride, citrate, fluoride, gluconate, hydroxide, iodate, lactate; sulfate (dihydrate), and tartrate, as well as calcium/phosphorus salts including: acid calcium phosphate, calcium biphosphate, calcium phosphate (monobasic), dicalcium phosphate dihydrate, monocalcium phosphate (anhydrous), monocalcium phosphate (monohydrate), primary calcium phosphate, and tricalcium phosphate. The preferred calcium salts are calcium chloride, calcium lactate, monocalcium phosphate (anhydrous), and monocalcium phosphate (monohydrate). Calcium chloride is the most preferred calcium salt.

The inventive method in particular comprises co-processing dispersed attrited MCC and dissolved sodium alginate in an aqueous media in any order of addition and then introducing calcium ions to displace sodium ions until at least a barrier dispersant effective amount of a water insoluble calcium/sodium alginate complex is formed in situ, adsorbed on or otherwise coating or occluding the MCC particles. It is an important aspect of the inventive processes that the MCC and alginate salt complex is subjected to high shear conditions before drying. In this context, the term "high shear conditions" should be understood as meaning conventional food processing conditions such as are afforded by a Waring blender or a Gifford Wood colloid mill, or a homogenizer at 2500 to 6000 psi [175 to 420 kg/cm$^2$]. High shear processing of the MCC:alginate coprocessed slurry is a preferred process for achieving effective surface coverage of the finely divided MCC by the alginate salt complex.

The MCC and alginate salt complex are then further coprocessed by drying the coated particles. The drying of the coprocessed particles may be accomplished in any known manner that retains the barrier dispersant coating on the MCC particles, including spray drying and bulk drying. Spray drying is preferred.

In further detail, the method for the manufacture of the inventive composition comprises:

[a] forming an aqueous dispersion of water and attrited microcrystalline cellulose;

[b] mixing sodium alginate with the dispersion in an amount effective to form an MCC and sodium alginate aqueous mixture;

[c] forming an alginate salt complex by introducing calcium ions into the MCC and sodium alginate aqueous mixture until sufficient alginate salt complex is precipitated on the MCC particles to afford a slurry of MCC at least partially coated by the alginate salt complex;

[d] subjecting the slurry to high shear conditions; and

[e] drying the slurry to form MCC particles with an alginate salt complex barrier dispersant coating.

The spray drying of MCC with sodium alginate alone resulted in the formation of cellulose aggregates which did not disperse in water and had no build-up in viscosity or gelling properties. The formation of a water-insoluble salt alone was shown to be not effective for the purposes of this invention, since a completely water-insoluble barrier dispersant coating does not permit redispersion of the coated attrited MCC particles in water. Calcium alginate is hydrophilic but does not dissociate (dissolve) in water and thus does not form the barrier dispersant salt complex of this invention. For this reason, a simple mixture of water-soluble salt (sodium alginate) and water-insoluble salt (calcium alginate) was not feasible. That is, it is not possible effectively to combine these salts in an aqueous system. It also is particularly useful that alginates are hydrocolloids classified as a natural source material. For these reasons, the inventive alginate calcium/sodium salt complex was optimum.

The minimal useful amount of calcium alginate present in the salt complex of this invention is that which is effective to prevent the attrited MCC particles from agglomerating with each other upon drying from wet-cake. The minimal useful amount of sodium alginate in the salt complex of this invention is that amount which is effective to allow the dry MCC particles to redisperse in an aqueous system without agglomerating.

DETAILED DESCRIPTION OF THE INVENTION

Other than in the operating examples, or where otherwise indicated, all numbers expressing quantities of ingredients, parameters, or reaction conditions used herein are to be understood as modified in all instances by the term "about".

A weight percent ratio MCC:alginate salt complex of 80:20 was used in most of the following examples. The 80:20 ratio was representative rather than optimum, although it was found to be particularly useful. The ratio was maintained wherever feasible to permit other variables such as the calcium:sodium weight ratio within the alginate salt complex to be compared, as well as to permit comparison of the properties exhibited by the inventive composition when redispersed in aqueous systems.

The broadest useful range of alginate complex concentration to achieve the desired barrier and dispersant properties according to this invention is 5 to 25 wt % of the total composition, a preferred range of alginate complex concentration is 10 to 25 percent by weight, 10 to 20 wt % being most preferred, the balance to 100 wt % comprising the attrited MCC particles. Experiments on compositional variations established that a 10 wt % alginate complex level was the minimum alginate concentration required to produce the preferred MCC redispersibility properties, although the lower level (5 wt %) of alginate complex could still be effective, depending upon the calcium to sodium ratio in the alginate salt complex.

At 100% or more of stoichiometric replacement of sodium with calcium (resulting in complete or almost complete conversion of sodium alginate to calcium alginate), aggregated particles with a somewhat spherical shape and greatly reduced dispersibility in aqueous systems are produced. While this result is outside the main embodiments of this invention as the aggregated particles produced in this manner remain intact under simulated water-based food processing conditions, such particles may themselves be useful. This further demonstrates that there is an effective calcium:sodium weight ratio within the alginate salt complex which produces the inventive barrier dispersant properties. In effect, the barrier dispersant with dried MCC particles results in a composition having the same (or better) desirable water dispersibility properties as previously existing colloidal-type MCC products.

The exact mechanism by which the system functions is not fully understood. It is speculated that the calcium alginate formed in situ in the complex at least partially coats the surfaces of the finely divided MCC particles thus providing the barrier effect during drying, and the swelling capacity of that amount of soluble sodium alginate which remains present in the complex provides the dispersant effect by aiding in the dispersibility of the MCC particles in water as well as in the stabilization of the resulting colloidal dispersion. Reproducibility of both the product and the process was established based on the number of experimental runs.

EXAMPLES

Initial experiments involved the spray drying of 3% slurries of MCC: sodium alginate at various ratios (5%-20% alginate level) on a 3 foot diameter [91.4 cm]

Bowen dryer. The calcium salt was used at 40% of the stoichiometric amount needed for complete reaction with the sodium alginate. It takes approximately 0.18 grams of calcium to react stoichiometrically with 2.5 grams of sodium alginate (see Calcium Salts In Algin Gel Systems: Technical Supplement No. 2, Kelco Company). Materials used were sodium alginate ("Kelgin HV" from Kelco), calcium chloride, sodium hexametaphosphate (from FMC), tetrasodium pyrophosphate (from FMC), 85% $H_3PO_4$ (phosphoric acid - from FMC), and attrited MCC wetcake (from FMC).

The spray drying runs were deemed mechanically successful as there was no difficulty encountered in drying the inventive compositions at the set conditions. No significant differences in powder yields were shown with a change in composition. With regard to the wet-end processing, high shear processing was necessary to effect gelation of the alginate and provide effective surface coverage of the individual attrited MCC particles with the calcium/sodium alginate salt complex.

At 5 wt % alginate level, the 80:20 MCC:alginate powder did not disperse in water that is, the cellulose aggregates remained intact after 30 minutes mixing under moderate agitation. Under high shear conditions, no improvement was shown. The reconstituted system did not develop viscosity and exhibited a dense close-packed sediment after overnight storage. It is believed, however, that by varying the calcium to sodium ratio within the alginate salt complex, a 5 wt % alginate would be effective.

Results showed that a 10 wt % alginate level, (that is, 90:10 MCC:alginate weight ratio) was the minimum alginate concentration required to produce effective MCC redispersibility properties for the given calcium:sodium ratio in the alginate complex. An inventive composition of a 90:10 MCC:alginate ratio readily dispersed in water, developed viscosity and formed a stable gel (at 3.0% concentration) on standing - analogous to colloidal MCC.

The next set of experiments were to determine the optimum level of soluble calcium salt for MCC dispersibility/maximum viscosity properties. The experiments involved the spray drying of 3% slurries of 80:20 MCC:alginate according to this invention using from 20%–80% of the stoichiometric amount of calcium salt needed for complete reaction with the alginate. To determine the effect of completely precipitating the sodium alginate to its calcium form in the presence of MCC, an 80:20 MCC:alginate spray drying run was also prepared at an excess (150%) of the stoichiometric amount of calcium salt. Calcium chloride (solubility 40% in cold water, 59% in hot water) was the soluble calcium salt used as the source of calcium ions and gelling agent. It may be noted that commercial processing of sodium alginate involves the use of calcium chloride to precipitate calcium alginate from a crude alginic solution prior to an acid treatment step, although the purpose and result of the precipitation are unrelated to the present inventive process.

The processing consisted of initially dispersing the attrited MCC wetcake (dissolving grade pulp - 42.4% solids) in the available water in a Gifford Wood colloid mill at a rheostat voltage setting of 90 for 5 minutes. The required amount of high viscosity sodium alginate ("Kelgin HV" - 12% moisture) was added and mixed for about 20 minutes. The required amount of calcium chloride was added and mixed for 10 minutes. The slurries were homogenized at 2500 psi [175 kg/cm$^2$] prior to spray drying. They were dried at an inlet temperature setting of 170° C. and an outlet temperature of 95° C. Atomization was accomplished with the nozzle, 0.1 inch [0.25 cm] opening at 90 psi [6.3 kg/cm$^2$] atomizing air pressure. The powders were reconstituted at 3% solids concentration under Waring blender conditions (rheostat voltage setting of 90) for 5 minutes. Viscosity of the reconstituted dispersions was measured with a "Brookfield RVF", #4 spindle at 0.5 rpm and 25° C. after overnight storage. The state of MCC dispersion was assessed by microscopic analysis.

The effective stoichiometric amount of calcium needed in the inventive processes was established as ranging between 30 % and 60 % in order to produce the desired properties in the inventive composition. The minimum amount of calcium required to produce effective MCC redispersibility properties was 30% of stoichiometric. The coprocessed inventive powder composition dispersed in water under moderate shear, developed adequate viscosity, and formed a stable gel after reconstitution under high shear. The optimum reaction was obtained at 60 % of stoichiometric as the maximum viscosity was reached at this level.

Above a 60% of stoichiometric level, the inventive coprocessed powder compositions rapidly become more difficult to disperse, especially under moderate conditions. At 80% of stoichiometric the inventive coprocessed powder compositions did not readily disperse and develop viscosity under moderate shear but formed a stable gel similar to that of the 30% level after high shear reconstitution. In all cases, complete MCC dispersibility and full viscosity were achieved under high shear Waring blender conditions.

TABLE 1

The effect of CaCl$_2$ concentration on the viscosity of 3 wt % aqueous dispersions of the inventive 80:20 MCC:alginate salt complex composition

| CaCl$_2$ CONCENTRATION (wt % of stoichiometric) | VISCOSITY (cps)* |
|---|---|
| 20 | 1,000 |
| 30 | 44,000 |
| 40 | 78,000 |
| 50 | 104,000 |
| 60 | 130,000 |
| 70 | 72.000 |
| 80 | 59,000 |

*Brookfield #4 spindle, 0.5 rpm, 25° C.

At a 150% of stoichiometric level (complete precipitation of the sodium alginate to its calcium form), aggregates with a somewhat spherical shape were produced. They remained intact even after 15 minutes mixing in a Waring Blender. The reconstituted system did not develop viscosity and exhibited a two-phase separation after overnight storage.

In terms of functional properties, the coprocessed MCC:alginate powders prepared from the initial experiments were evaluated for milk gelling (instant milk pudding/pie filling formulation, a cold-processed food product where alginates are typically used) and suspension properties (cocoa suspension in dry cocoa mixes).

The milk gel systems were prepared in accordance with the following formulation: 2–4 wt % inventive powder; 14 wt % sugar; 0.4 wt % TSPP; and whole milk to balance. The inventive dry powder compositions were initially dispersed in cold milk and mixed under moderate agitation for 15 minutes. The TSPP was added and mixed for 5 minutes. Powdered confectioners (fine 10x) sugar was added and mixed for 3 minutes. The mixtures were poured into gel dishes and allowed to set at room temperature for about 2 hours prior to freezing. The systems were frozen at −20° F. [−29° C.] for 24 hours and thawed to 77° F. [25° C.] for 5 hours prior to evaluation. The gel strength, texture, and amount of syneresis were determined by visual observation. In milk gel systems, uniform and continuous opaque gels were formed at 2 wt % inventive powder concentration. The milk gels were freeze/thaw stable as they maintained their gel structures and showed no sensitivity to syneresis.

The inventive coprocessed powders were also evaluated for cocoa suspension in dry cocoa mixes. The powders were dry blended (1% inventive powder composition) with pre-formulated cocoa drink mixes (8.1% sucrose, 1.6% non-dairy creamer, and 1% cocoa) and reconstituted in water with moderate agitation for 30 minutes. The functionality was determined by the ability of the inventive powder compositions to maintain a 1% cocoa loading in suspension. The inventive composition at 15 wt % and 20 wt % alginate level functioned as a cocoa suspending agent in dry cocoa mixes. After 24 hours storage, the beverage systems prepared from the powders exhibited a stable cocoa suspension. The evaluation showed that this 2-component inventive MCC-based composition eliminated the need for a diluent such as whey or maltodextrin in order to achieve rapid redispersibility of the MCC and for it to function in a dry mix type of food.

To determine the MCC dispersibility properties in water and in milk systems, a sustained spray drying run of 80:20 MCC:alginate according to this invention (using calcium chloride at 60% of the stoichiometric reaction) was produced on a 3 foot diameter [91.4 cm] dryer. The processing comprised initially dispersing the attrited MCC wetcake (dissolving grade pulp) in the available water in a Gifford Wood colloid mill (rheostat voltage setting of 90 for 5 minutes). The required amount of high viscosity sodium alginate ("Kelgin HV") was added and mixed for 30 minutes. This time, a 5% solution of calcium chloride was prepared. This was added to the MCC:sodium alginate slurry and mixed for about 10 minutes. The slurry was homogenized at 2500 psi [175 kg/cm²] prior to spray drying. It was dried at an inlet temperature setting of 170° C. and an outlet temperature of 95° C. Atomization was accomplished with the nozzle, 0.1 inch [0.25 cm] opening at 90 psi [6.3 kg/cm²] atomizing air pressure.

The inventive coprocessed MCC:alginate dry powder (at an 80:20 weight ratio) was physically characterized to ascertain its dispersibility in water and in milk.

TABLE II

The effect of mixing conditions/temperature on viscosity as a function of concentration

| | VISCOSITY (cps)* | | |
|---|---|---|---|
| CONCENTRATION | low shear, 77° F. [25° C.] | low shear, 180° F. [82° C.] | high shear, 77° F. [25° C.] |
| 1.0 | 2,000 | 8,000 | 20,000 |
| 2.0 | 8,800 | 32,800 | 58,000 |
| 3.0 | 36,000 | 76,800 | 124,000 |
| 4.0 | 44,800 | 101,600 | 166,000 |
| 5.0 | 57,600 | 138,400 | 190,000 |

*Brookfield #4 spindle, 0.5 rpm, 25° C.

The coprocessed powder (1-5% solids concentration) dispersed more readily at elevated temperatures of 160°-190° F. [71°-88° C.] than at ambient temperature of about 72° F. [22° C.].

Without the following explanation forming a part of this invention, it is believed that in ambient temperature water dispersion the calcium ions required for the setting reaction are already in solution with the alginate, and as a result the calcium-induced interchain association occurs immediately, thereby requiring either longer mixing time or high shear to release and disperse the MCC. With heating, increased viscosity development results from full dispersibility of the MCC. It also is believed that the alginate-calcium setting does not occur at elevated temperatures because the alginate chains have too much thermal energy to permit alignment [see the "Handbook of Water Soluble Gums and Resins" chapter on Alginates by Cottrell & Kovacs]. Based on the viscosity profiles, maximum viscosity is obtained under high shear conditions. Shear processing therefore exerts a greater influence than heat with regard to full viscosity development.

Most food products, at least during preparation, have a neutral to acid pH. Therefore it is a further advantage of this invention that a reconstituted MCC dispersion using the inventive composition still showed good MCC dispersibility and stability to a pH as low as 3, as compared to the prior art (MCC with a CMC barrier dispersant), which evidenced good dispersibility only to a pH as low as 4-4.5. Below a pH of 3 alginic acid was precipitated and dispersions of the inventive compositions exhibited instability accompanied with a significant drop in viscosity. As would be expected [see "Microcrystal Polymer Science, Chapter Two - Microcrystalline Celluloses", O. A. Battista, McGraw-Hill, N.Y. (pub.) 1975 pages 17-57] with an attrited MCC colloidal suspension, the addition of a calcium sequestrant (for example, without limitation, sodium hexametaphosphate) improved the dispersibility of the MCC in cold water but caused a decrease in the setting rate of the MCC gel to be formed. Unexpectedly, when dry blended with a salt (such as sodium chloride), the inventive coprocessed powder in the presence of a sequestrant dispersed readily in water at elevated temperatures. This suggests potential application of the inventive composition as a stabilizing agent in instant dry mixes such as dry blended sauces and gravies. Advantageously, in cold milk, the inventive composition dispersed readily in the presence of tetrasodium pyrophosphate (TSPP), a result not possible with existing colloidal MCC products.

The coprocessed inventive 80:20 MCC:alginate powder was evaluated in 4% butterfat frozen dessert and salad dressings and compared directly to existing colloidal MCC products.

The frozen dessert products were prepared in accordance with the formulation: 4% butterfat; 13% non-fat milk solids; 12% sucrose; 5% corn syrup solids; 0.4% inventive composition; 0.10% high viscosity carboxymethylcellulose; 0.01% carrageenan (SeaKem ® - a product of FMC Corporation); 0.30 % monodiglyceride:polysorbate 80 composition (Tandem TM 100 k a product of Humko Chemicals) and water to balance.

In a salad dressing formulation, the inventive composition was evaluated at 1.75 wt % use level. The procedure for making these food products was similar to that established for existing colloidal MCC products.

A water gel system comprising the inventive composition and sugar was also prepared. The sugar was added at a level to produce a 40% total solids system.

The inventive coprocessed powder at 2 to 5 wt % was initially dispersed in a Waring Blender and mixed until full gelation was attained. Sugar was then added and mixed an additional 15 minutes. The gel was allowed to set for approximately 2 hours prior to freezing. The system was frozen at −20° F. [−29° C.] for 24 hours and thawed to 77° F. [25° C.] for 5 hours prior to evaluation. The gel strength, texture, and syneresis were determined by visual observation.

The functionality of colloidal MCC in frozen desserts and salad dressings was duplicated with the inventive coprocessed MCC:alginate salt complex powder. In a 4 wt % butterfat frozen dessert system, a hard pack sample containing the inventive 80:20 MCC:alginate composition was characterized as having body/texture qualities similar to those made with known colloidal MCC products.

Advantageously, and unlike previously known colloidal MCC products, in salad dressings the inventive MCC:alginate salt complex composition did not require a protective colloid (such as xanthan gum) in order to function. The inventive composition also functioned as a cocoa suspending agent in dry cocoa mixes. These were all unexpected properties of the inventive coprocessed powder, since past work has shown that colloidal MCC requires other types of ingredients such as whey or maltodextrin in order to achieve rapid MCC redispersibility and function as a dry mix food. The water gel system produced from the inventive 80:20 MCC:alginate composition was freeze/thaw stable, as it maintained its gel structure and texture and showed no sensitivity to syneresis.

Conclusions from Examples

Spray drying of MCC particles with sodium alginate alone results in undispersed cellulose aggregates which have no gelling properties and which are not dispersible in water. The coating of MCC particles with calcium alginate alone results in non-dispersible MCC particles. However, by exploiting the reaction of calcium salts with sodium alginate, the inventive MCC:alginate barrier dispersant composition with redispersibility properties similar to colloidal MCC can be produced. High shear processing of the MCC:alginate coprocessed slurry was preferred for effective surface coverage of the finely divided MCC particles by the inventive barrier dispersant.

An important advantage of the inventive barrier dispersant composition is that the water in colloidal MCC can be eliminated, resulting in stable non-aggregated MCC dry powder particles of lower weight per volume.

Additionally, the inventive composition has certain functional properties such as dispersibility in milk systems, milk gelling, and low pH stability which are not exhibited by known colloidal MCC products.

Moreover, this invention has the important advantage that MCC:alginate compositions would be classified as a natural source material and therefore readily accepted by regulatory authorities for food and pharmaceutical uses.

We claim:

1. A dry composition dispersible in aqueous media comprising attrited microcrystalline cellulose (MCC) particles at least partially coated with at least a barrier-effective and dispersant-effective amount of an alginate salt complex barrier dispersant.

2. The composition of claim 1 wherein the alginate salt complex is a calcium/sodium alginate salt complex.

3. The composition of claim 1 wherein the alginate salt complex comprises about 5 to 25 wt % of the weight of the total composition.

4. The composition of claim 2 wherein the alginate salt complex comprises about 5 to 25 wt % of the weight of the total composition.

5. The composition of claim 3 wherein the alginate salt complex comprises about 10 to 25 wt % of the weight of the total composition.

6. The composition of claim 4 wherein the alginate salt complex comprises about 10 to 25 wt % of the weight of the total composition.

7. The composition of claim 6 wherein the alginate salt complex comprises about 10 to 20 wt % of the weight of the total composition.

8. The composition of claim 2 wherein the weight ratio of calcium:sodium within the alginate salt complex is 0.43–2.33:1.

9. The composition of claim 8 wherein the weight ratio of calcium:sodium within the alginate salt complex is 1–2:1.

10. The composition of claim 9 wherein the weight ratio of calcium:sodium within the alginate salt complex is 1.3–1.7:1.

11. The composition of claim 10 wherein the weight ratio of calcium:sodium within the alginate salt complex is about 1.5:1.

12. The composition of claim 1 wherein both the MCC and the alginate salt complex are food grade.

13. A process for manufacturing a dry composition comprising attrited MCC particles at least partially coated with at least a barrier-effective and dispersant-effective amount of an alginate salt complex comprising:

[a] forming an aqueous dispersion of water and attrited microcrystalline cellulose;

[b] mixing sodium alginate with said dispersion in an amount effective to form an MCC and sodium alginate aqueous mixture;

[c] forming an alginate salt complex by introducing calcium ions into the MCC and sodium alginate aqueous mixture until sufficient alginate salt complex is precipitated on the MCC particles to afford a slurry of MCC at least partially coated by the alginate salt complex;

[d] subjecting the slurry to high shear conditions; and

[e] drying the slurry to form MCC particles with an alginate salt complex barrier dispersant coating.

14. The process of claim 13 wherein the calcium ions are introduced by adding a calcium salt to the MCC and sodium alginate mixture.

15. The process of claim 14 wherein the calcium salt is one or more calcium salts which dissociate at least to some degree in water and which do not leave residues which are not approved for food use.

16. The process of claim 15 wherein the calcium salt is one or more of calcium: acetate, carbonate, chloride, citrate, fluoride, gluconate, hydroxide, iodate, lactate; sulfate (dihydrate), tartrate, and calcium/phosphorus salts including: acid calcium phosphate, calcium biphosphate, calcium phosphate (monobasic), dicalcium phosphate dihydrate, monocalcium phosphate (anhydrous), monocalcium phosphate (monohydrate), primary calcium phosphate, and tricalcium phosphate.

17. The process of claim 16 wherein the calcium salt is one or more of: calcium chloride, calcium lactate, monocalcium phosphate (anhydrous), and monocalcium phosphate (monohydrate).

18. The process of claim 17 wherein the calcium salt is calcium chloride.

19. The process of claim 13 wherein the alginate salt complex is a calcium:sodium complex having a weight ratio calcium:sodium of 0.43–2.33:1.

20. The process of claim 19 wherein the alginate salt complex is a calcium:sodium complex having a weight ratio calcium:sodium of 1–2:1.

21. The process of claim 20 wherein the alginate salt complex is a calcium:sodium complex having a weight ratio calcium:sodium of 1.3–1.7:1.

22. The process of claim 21 wherein the alginate salt complex is a calcium:sodium complex having a weight ratio calcium:sodium of about 1.5:1.

23. The process of claim 13 wherein the alginate salt complex barrier dispersant coating comprises 5 to 25 wt % of the dried product.

24. The process of claim 23 wherein the alginate salt complex barrier dispersant coating comprises 10 to 25 wt % of the dried product.

25. The process of claim 24 wherein the alginate salt complex barrier dispersant coating comprises 10 to 20 wt % of the dried product.

26. A method for forming a water gel comprising mixing with water a gel-forming effective amount of the composition of claim 2.

27. A method for forming a milk gel comprising mixing with milk a gel-forming effective amount of the composition of claim 2.

* * * * *